(12) United States Patent
Parham (10) Patent No.: US 8,360,872 B2
(45) Date of Patent: Jan. 29, 2013

(54) GAMING MACHINES USING MULTIPLE PERSONALITIES

(75) Inventor: Tyler T. Parham, Reno, NV (US)

(73) Assignee: Gaming Enhancements, Inc., Reno, NV (US)

( * ) Notice: Subject to any disclaimer, the term of this patent is extended or adjusted under 35 U.S.C. 154(b) by 59 days.

(21) Appl. No.: 12/859,706

(22) Filed: Aug. 19, 2010

(65) Prior Publication Data

US 2011/0045911 A1     Feb. 24, 2011

Related U.S. Application Data

(60) Provisional application No. 61/235,308, filed on Aug. 19, 2009.

(51) Int. Cl.
*A63F 13/00* (2006.01)
(52) U.S. Cl. ............... 463/29; 463/16; 463/42
(58) Field of Classification Search ............ 463/16, 463/29, 42
See application file for complete search history.

(56) References Cited

U.S. PATENT DOCUMENTS

| | | | | |
|---|---|---|---|---|
| 6,993,326 B2 * | 1/2006 | Link et al. | | 455/414.1 |
| 7,278,918 B2 * | 10/2007 | Lind | | 463/20 |
| 7,682,245 B2 | 3/2010 | Nguyen | | |
| 7,722,466 B2 | 5/2010 | Rothschild | | |
| 7,758,416 B2 | 7/2010 | Randall | | |
| 2005/0124411 A1 * | 6/2005 | Schneider et al. | | 463/29 |
| 2006/0148549 A1 * | 7/2006 | Walker et al. | | 463/16 |

\* cited by examiner

*Primary Examiner* — James S McClellan
(74) *Attorney, Agent, or Firm* — Brian N. Young; Fountainhead Law Group P.C.

(57) ABSTRACT

In one embodiment, a method includes determining player information for a player. A game personality is determined for a gaming machine. The game personality is a set of behavior characteristics for the gaming machine. It is determined if a solicitation for a gaming machine is triggered by applying the player information for a player to the game personality. The solicitation is performed for the player if the solicitation is triggered.

23 Claims, 7 Drawing Sheets

GAMING MACHINES USING MULTIPLE PERSONALITIES

CROSS REFERENCE TO RELATED APPLICATIONS

The present application claims priority to U.S. Provisional App. No. 61/235,308 for "Gaming Machines Using Multiple Personalities" filed Aug. 19, 2009, the contents of which are incorporated herein by reference in their entirety.

BACKGROUND

Particular embodiments generally relate to gaming and, more particularly, game functionality for providing gaming machines with multiple personalities and a bonus attract mode.

Gaming establishments, such as casinos, are always attempting to attract more players to their establishments. For example, gaming establishments mail promotions to players with offers that are designed to get the player to come to the casino and require that the player travel to the gaming establishment to receive the offer.

The gaming establishments hope the player comes to the gaming establishment to collect the offer and then continue to stay to spend more money on different services (e.g., gambling, food, etc.). In some cases, however, the player may collect the offer, but not stay very long. Also, some players simply ignore the offers that are received in the mail because the offer itself is not worth the effort required to travel to the gaming establishment.

Gaming promotional offers are sent from a system external from the game, such as the hotel management system or from the player tracking system, and may cover a wide range of promotions, such as free play on any gaming machine to a free night stay at the gaming establishment's venue. The promotional offers are also established ahead of time to lure high quality players to play at a particular venue during a specific time interval or event. This system attempts to lure the player back to the gaming establishment after the player has left, which may make it harder to get the player back to the gaming establishment to take advantage of the promotion. Thus, promotions may need to be very attractive to the player and may increase costs to the gaming establishment because of what the promotion needs to offer.

SUMMARY

In one embodiment, a method includes determining player information for a player. A game personality is determined for a gaming machine. The game personality is a set of behavior characteristics for the gaming machine. It is determined if a solicitation for a gaming machine is triggered by applying the player information for a player to the game personality. The solicitation is performed for the player if the solicitation is triggered.

In another embodiment, a method comprises: determining a game personality for a gaming machine that is not being played, the game personality being a set of behavior characteristics for the gaming machine; triggering a solicitation offer for the gaming machine that is not being played based on the game personality; causing the gaming machine to enter an attract mode to offer the solicitation offer; and participating in the solicitation offer on the gaming machine when a player interacts with the gaming machine in response to the attract mode.

In another embodiment, a system comprises: a plurality of gaming machines, wherein a portion of gaming machines include different game personalities, the game personality being a set of behavior characteristics for the gaming machine; wherein each gaming machine is configured to: determine player information for a player; determine if a solicitation for a gaming machine is triggered by applying the player information for a player to the game personality; and cause the solicitation to be performed for the player if the solicitation is triggered The following detailed description and accompanying drawings provide a better understanding of the nature and advantages of the present invention.

DETAILED DESCRIPTION

Described herein are techniques for a gaming system using game personalities. In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

Figure 1:
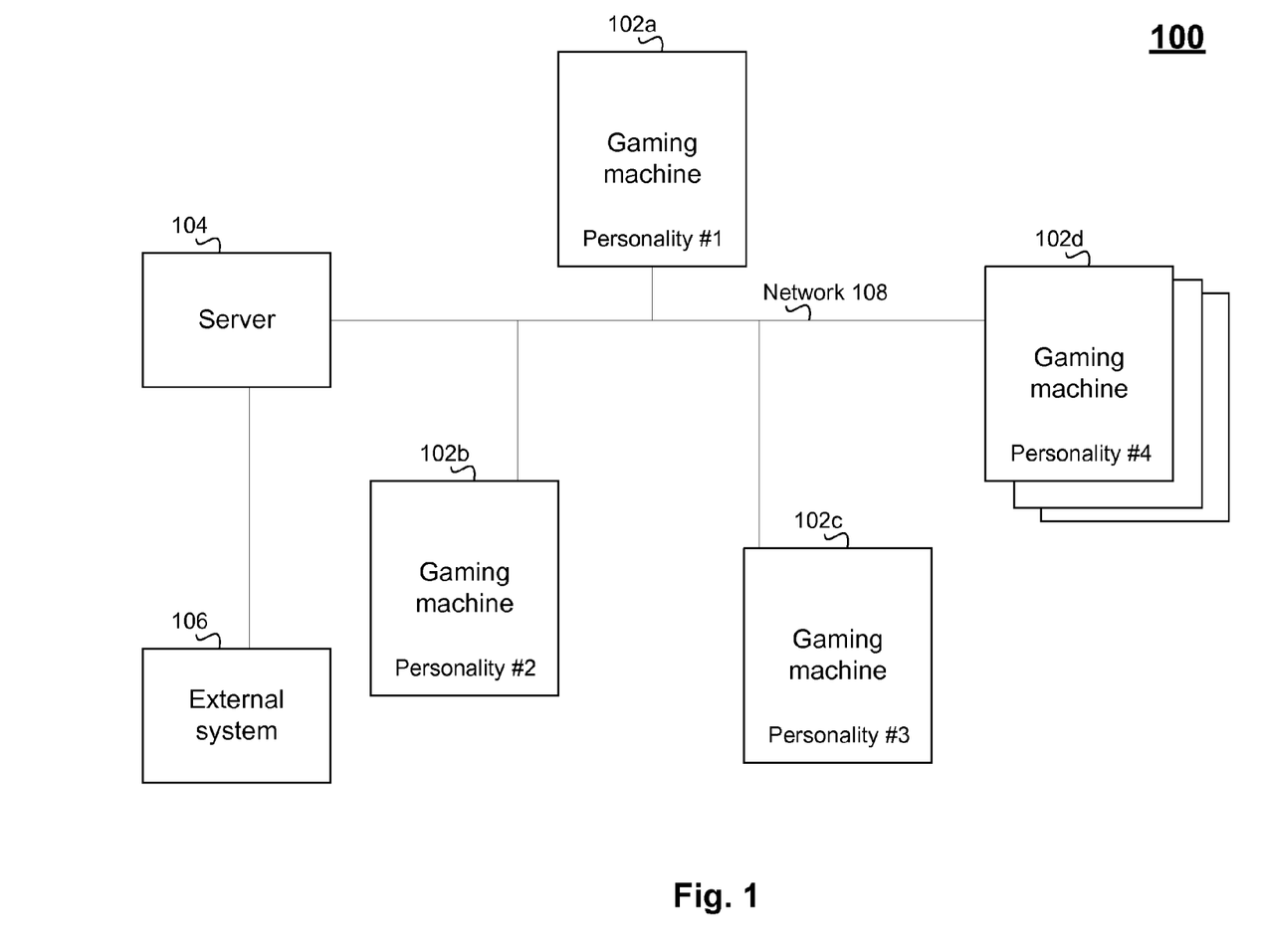
FIG. 1 depicts an example of a system for providing gaming machines with multiple personalities according to one embodiment.

FIG. 1 depicts an example of a system 100 for providing gaming machines with multiple personalities according to one embodiment. System 100 includes multiple gaming machines 102. Gaming machines 102 may be stand-alone gaming machines or may include a cluster of gaming machines. For example, a cluster of gaming machines may be N number of gaming machines that may be networked together.

For example, a cluster of gaming machines may be offering the same game or related games where players may play the game together or singularly. In one embodiment, gaming machines 102 may offer games of chance or casino games, such as video poker, slots, keno, or other games.

Each gaming machine 102 may be designed at the time they are built or retrofitted with the hardware and software for gaming machine 102 to implement the methods of particular embodiments. Each gaming machine 102 may have a programmable computer controller that allows the gaming machine to be programmed and communicate with any type of network or wireless system and any communication means necessary to communicate with any players, needed to implement particular embodiments. Particular embodiments provide gaming machine control logic including game personalities that may be combined with player profile information at the gaming machine to make decisions on how the game may interact with the player in real-time. Gaming machine 102 may include personality control logic external from game logic. Personality control logic may control the solicitation of players based on the player profile information and game personalities. Game logic may control the game being played by the player on gaming machine 102. The personality control logic may be included in gaming machine 102 or in an external system 106. Also, the personality control logic may be included in the game logic.

A server 104 may be coupled to gaming machines 102. Server 104 may be configured to communicate information to gaming machines 102. For example, player profile information may be sent to gaming machines or stored at the gaming machines 102 or collected in real time allowing the gaming device to create its own player(s) profile. Also, server 104 may determine actions that should be performed by gaming machines 102, as will be discussed below in more detail. In one example, server 104 may act as a controller that controls gaming machines 102.

External system 106 may include the game personality logic and be used to control gaming machines 102 to implement the actions based on game personalities as described below. Also, gaming machines 102 may include the game personality logic, or the game personality logic may be distributed.

Particular embodiments use game personalities to determine various actions to perform. Player profiles may be compared to game personalities to determine an action to perform for different players. Game personalities will be described first and then player profiles and actions that can be performed. Examples using the game personalities are then described.

Game Personalities

Game personalities may be used to allow a gaming machine 102 to communicate with players to create a relationship between players and gaming machines 102. Gaming machines 102 may be given different personalities traits similar to different human being traits for players to create relationships with gaming machines 102 based on their personalities.

Gaming machines 102 may have different personalities. However, some gaming machines 102 may have the same personality, but in system 100, at least two gaming machines 102 have different personalities. Game personalities may be any behavior characteristics that may be designed for a gaming machine 102 that allows the gaming machine to communicate with players to develop relationships with the players by providing them with information, entertainment, offers, bonuses, interaction, etc. Game personalities may comprise a plurality of game behaviors compiled together in unique combinations to form the basis for unique game personalities. The game behaviors may be a set of characteristics that is associated with a gaming machine 102. For example, the set of characteristics may be a set of instructions, rules, parameters, features, offers, bonuses, etc. The set of parameters may determine different actions the gaming machine may perform, such as parameters for different offers/bonuses or amount of money each offer/bonus is worth. The set of rules may be applied to different types of information to determine actions for gaming machine 102. For example, player profile information may be run through the personality rules to determine an action to perform. The set of instructions may be applied to action to be performed by gaming machine 102. For example, when a gaming machine 102 has not been played for a period of time it may be instructed to go into a bonus attract mode to solicit player to play the game by offering them prizes if they play a predetermined amount of money in game play. The game personalities may provide the player with information pertaining to the game, casino, or anything else.

The parameters may be a set of specific game behaviors generated at the time of game creation or may be downloaded from external system 106 to the gaming machine 102 once gaming machine 102 has been placed on the gaming establishment floor (and connected to a network 108). Additionally, game personalities may be changed. For example, the game personalities may be changed in between player play sessions by downloading a new game personality from external system 106 to take the place of the pre-defined game personalities or be operable for a particular play session or time interval. Game personalities may also morph or change over time based on how players play and interact with the game without any interaction from an external system 106, or based on the win loss outcomes of the game being played on the gaming device.

The actions that may be performed are dynamic and may affect game play for the player. One action may be solicitations that may affect future game play for the player, such as awarding bonuses, etc. For example, actions such as one or more of the following may be provided: Favorite player(s), trigger events, Bonus Budget, Game Type, Denomination, Bonus Game Type, Bonus Times, Fast Reel Play, Fast Card Deal, Slow Reel Spin, Slow Card Deal, Casino Comp Promotions, Casino Free Play, Game Free Spins, Game Random Bonus, Rare Promotional Offers, Generous Promotional Offers, and other game actions.

The solicitation of the player may be performed because gaming machine 102 has some offer or promotion for the player based on its personality, the player profile, the players or games activity or the combination of In one embodiment, different game personalities allow gaming machines 102 to provide different offers to particular players. For example, when certain player profile triggers an offer based on the characteristics of a gaming machine's personality, the gaming machine 102 may communicate the offer to the player. The solicitations, offers or bonuses may be used by gaming machine 102 when it is not being played to attract players to play the gaming machine in real-time. The specific actions will be described in more detail below.

Different gaming machines 102 may have different personalities. Thus, different offers may be determined by different gaming machines 102 based on different factors. For example, different players may receive offers from different gaming machines 102. The use of different personalities allows the gaming establishment to implement gaming machines 102 that offer unpredictability in their actions. This may make the gaming environment more fun for players, attract more players, and keep players in the gaming establishment longer.

Player Profiles

Player profiles include information specific to each player. The player profile may collect player play behavior compiled during the player's real-time game play, such as a specific game play session on a particular gaming machine 102. Additionally, non-real-time data may be added to the player profile, such as information for table games played, bets placed, play on gaming machines 102, and any action performed in and out of the casino that may be collected in real time or that a player may provide, such as favorite food, movies, games, casinos, vacation spots, hobbies, etc. Real-time play profiles may include information automatically collected from the games being played by the player, such as bets greater than some predefined value, bets sequencing in some predefined value, bets below some predefined value, time interval between spin button presses, frequent cash-outs with play starting back up quickly, games played, lucky player receiving over some specific number of bonuses, lucky player receiving over some specific game win, unlucky player receiving less than a specific amount payout over a play session time interval, preferred denomination, game type, and other player real-time personalities.

Player profile information may also include a player's preferences. The preferences may be automatically derived from a player's play or provide from a players questionnaire. For example, the preferences include a player's favorite machine (s) and games. The favorite gaming machines 102 may be determined based on a percentage play at a gaming machine 102 for a player. Similarly, the favorite games may be determined Other profile information may describe the player, such as a player's age, sex, etc.

In one embodiment, a player profile may be established by external system 106 or server 104 and downloaded to one or more gaming machines 102. Gaming machine 102 uses the player profile to interact with the game personality of gaming machine 102 to offer dynamic game features, promotions and offers to the player during a player's play session. In another embodiment, the downloaded player profile may be augmented with real-time player profile information. The augmented profile may be matched up with the game personality to provide additional actions, such as game related features, promotions and offers for the player matching one or more game personality criteria. For example, a game personality of fast play, generous promotional awards and free spin bonuses may match up with a player whose real-time player profile is comprised of a short time interval for spin button presses, large bets and no cash-outs.

Actions Performed based on Game Personalities and Player Profiles

The combination of game personality with a specific player profile may result in different actions being performed. The different actions may communicate an offer to a player currently not playing gaming machine 102 directly. The solicitations or offers may be used by gaming machine 102 when it is not being played to attract players with bonus opportunities to play gaming machine 102 in real-time. The solicitation may be while a player is still in the gaming establishment or the player is outside of the casino, e.g., at home. For example, while a player is playing another gaming machine 102, an offer to play another gaming machine 102 may be communicated to the player. Also, gaming machines 102 may detect when players are nearby using global positioning satellite (GPS), player tracking information, motion detectors on the gaming devices or any wireless communication device.

Players with specific player profiles may be defined and matched up with gaming machines 102 with specific game personalities thus enabling gaming machine 102 to entice only certain matching players. Particular gaming machines 102 may use particular player profiles with one of the different personalities associated with gaming machine 102. Because different players have different player profile information associated with them and gaming machines 102 different game personalities, different gaming machines 102 may offer different offers to only certain players. In one example, individual gaming machines 102 may determine which offers to provide to a player. Also, a program on a server 104 may make the determination and send messages to various gaming machines 102 that they should solicit different players.

In one example, a unique promotional offer is generated for a player directly from gaming machine 102 during game play. For example, a gaming machine 102 with a specific personality that has not been played by a player for a specific time interval may optionally join with one or more other gaming machines 102 (e.g., ones with similar gaming personalities or by a specific manufacturer or game theme) that have not been played for a specific time interval to offer a special bonus prize to a specific player, a group of players or any player the gaming device can attract, solicit or communicate with. The offer is intended to entice players to play gaming machine 102 that is soliciting the players.

When gaming machine 102 attempts to entice a specific player to play it, gaming machine 102 may send out communication to the player. The gaming machine may be designed or retrofitted with special attract features, such as sounds, lights, messaging, bonuses, etc., to attract players, enhance the players game play experience, and increase play time on the machine. Also, other communication methods may be used, such as text messages to cellular phones, personal computers, e-mail, messages from an external system such as a player tracking system that can locate a particular player and route messages from gaming machine 102 to the player, or communications sent to an in-house phone system used to leave a message for the player in their hotel room phone or local home phone. Gaming machine 102 may also use the existing player tracking system to communicate with players. When the player uses his/her player card at a gaming machine or at a player card kiosk/terminal, a message may be output to the player. Also, a special section at the player card kiosk/terminal for players to receive messages may be used. The messages may provide player profile information, the location of gaming machines with offers, redemption of bonuses, special messaging, etc.

Also, actions may alter game play of a player currently playing gaming machine 102. For example, game personalities may cause actions to be performed based on the player profile of the player during a particular play session. Based on how the player interacts with, and plays, the specific game during a play session, starting by the insertion of credits onto the game and continuing until game play stops for some defined interval of time marking the end of the session, gaming machine 102 compiles player information and forms a real-time player profile, independent from the player tracking system, to reflect the player's behavior during a particular play session. The player information may be an amount wagered, games player, win loss, play strategy used (e.g., which cards are held), and how many games played during a time period. This information is compared to the game personality and different play may be offered to maximize play for the player based on the player profile.

The game personality may be compared with player play statistics to determine when to offer the bonus. For example, if the game personality has a goal of a certain amount of active play by players, then after sitting idle for an amount of time, a bonus may be determined. Different players may also be solicited or the bonus may be open to all players.

To determine different players, player profiles are compared to the personality and selected. For example, players that have shown a preference for playing this gaming machine 102 may be selected.

The bonus may be awarded to the winner of the special bonus prize on only those gaming machines 102 that were enabled to offer the special bonus prize. To win the special bonus, a game is configured to trigger the bonus win based on a random event, predetermined event, money played, a specific combination of symbols, cards or other indicia either based on the games pay table or set up external from a pay table. Upon the trigger of the bonus by gaming machine 102, communication between the gaming machine 102 may provide the bonus game or a bonus payout. Gaming machine 102 communicates the bonus prize payout to the player by adding credits to the game, a gaming machine lock up requiring an attendant to go to the specific gaming machine and pay the player or by the generation of a ticket, or providing a card or other physical output from the game that can be validated to be a special bonus payout.

The bonuses may be funded in different ways. For example, bonuses made available to gaming machines 102 may be funded using a promotional prize pool set aside by the gaming establishment for X bonuses per day, a predefined payback prize pool where a specific percentage is held from only those games configured to support bonuses to be awarded to the winner of the bonus or a progressively growing prize pool based on contributions by all gaming machines 102 equipped with the game personality. The bonus may also be funded by promotional allowances, which may be revenue that is not directly from coin-in. For example, the promotional allowances may be a percentage or any revenue generated from gaming establishment that is used to fund prizes for the players.

Figure 2:
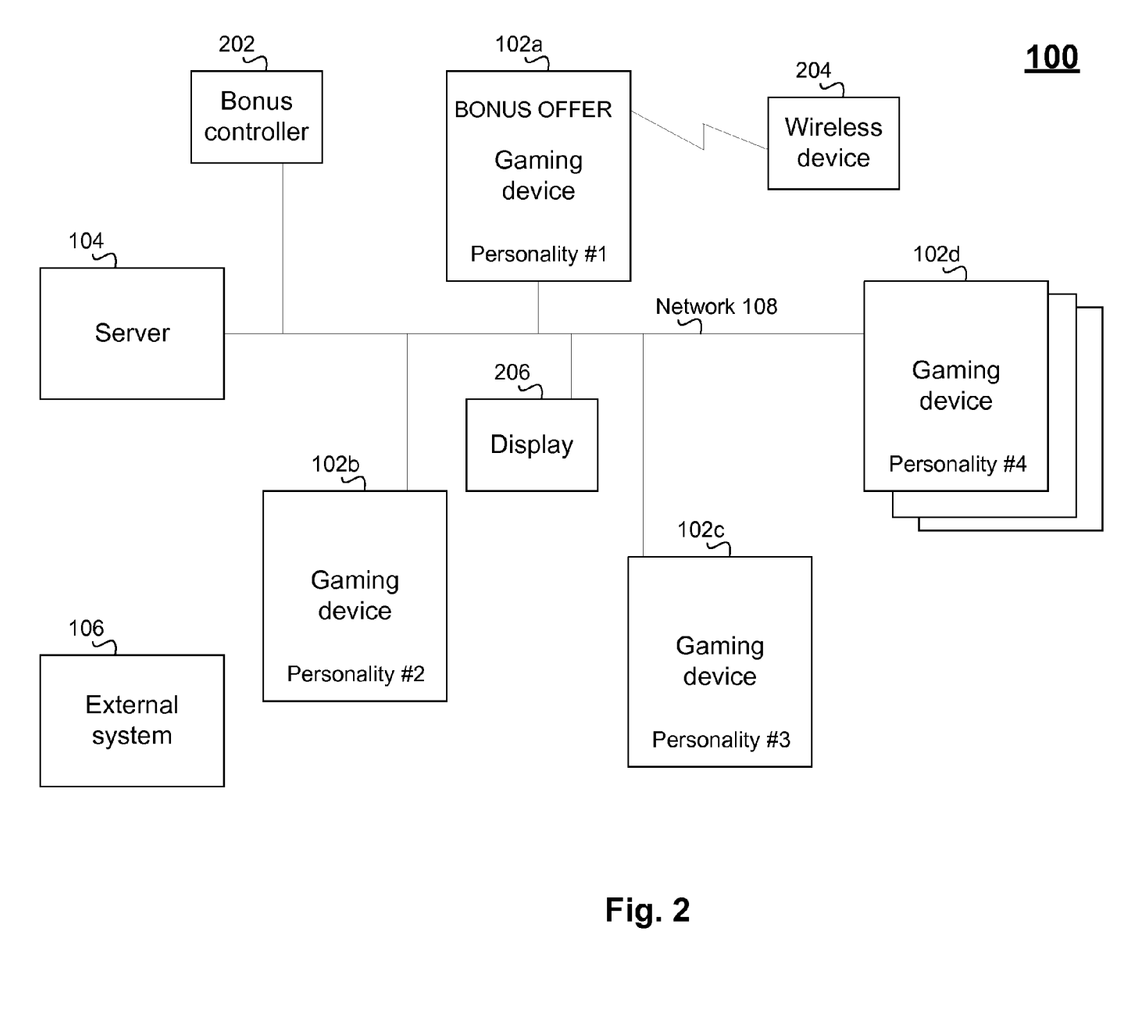
FIG. 2 shows a more detailed example of system for providing bonuses according to one embodiment.

FIG. 2 shows a more detailed example of system 100 for providing bonuses according to one embodiment. The bonus pools may be managed by an external system 106, local controllers 202, gaming machines 102, managed centrally by server 104, or any combination thereof.

Gaming machine 102a with a specific personality configuration that has not been played by a player for a specific time interval may join with other gaming machines 102 with similar gaming personality configurations or with gaming personality equipped games that have not been played for a specific time interval to offer a special bonus prize to entice players to play the gaming machines. A personality configuration may be when a gaming machine 102 has not been played for a random or predetermined amount of time, gaming machine 102 goes into an attract mode and solicit players to play the machine 102 to receive a promotional offer and/or bonuses.

Also, gaming machines 102 may go into an attract mode and solicit players with an opportunity to receive or win prizes if they play the soliciting gaming machine 102. Gaming machine 102 may also be programmed to communicate with other gaming machines 102 that are not being played to solicit players together as a team.

To win the bonus, game machine 102a may be configured to trigger the bonus win based on the amount of money played on gaming machine 102, on a specific combination of symbols, cards or other indicia either based on the games pay table or set up external from a pay table. A win may also be a random win not based on any particular game feature on the particular gaming machine, but rather generated by the game personality control logic.

Communication between the gaming machine 102a, bonus controller 202, server 104, or external system 106 occurs such that bonus control logic logs a bonus win and manages the bonus prize payout. The payout may be communicated to the player by adding of credits, a gaming machine lock up requiring an attendant to go to the specific gaming machine and pay the player, or by the generation of a ticket, card or other physical output from the game that can be validated to be a special bonus payout. Also, bonus prizes may be communicated to a player in other ways including direct communication from gaming machine 102a, graphical and audio communication at a display 206 (either integrated with gaming machine 102a or separate), or over a wireless communication connection to a communication machine such as a communication device (e.g., a cell phone) 204.

EXAMPLES

Figure 3:
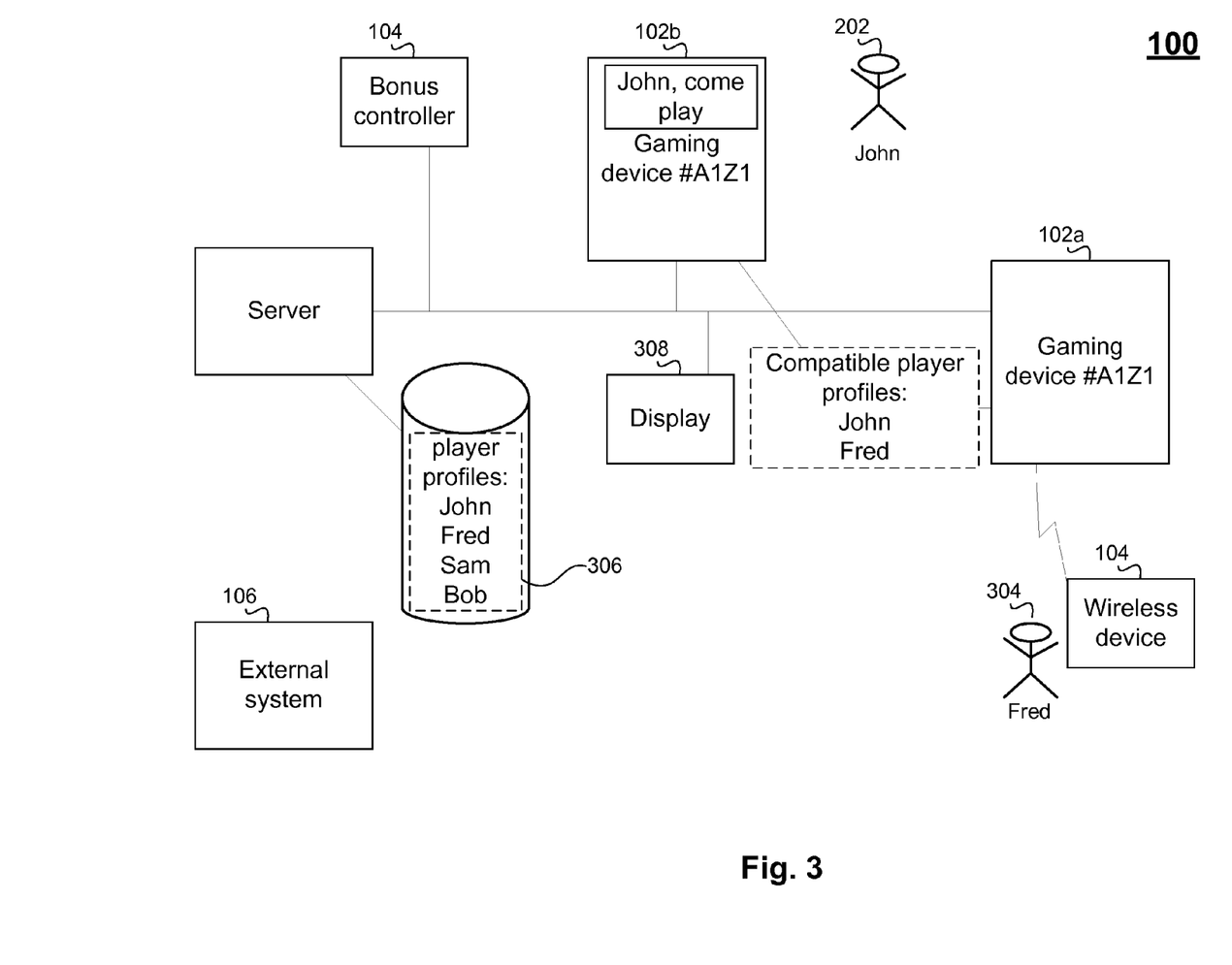
FIG. 3 depicts one example of using game personalities according to one embodiment.

Different examples will now be described. FIG. 3 depicts one example of using game personalities according to one embodiment. Players 302 and 304 may be solicited by gaming machines 102a and 102b, which are equipped with a specific personality configuration 306.

Players 302 and 304 have specific player profiles that may be defined by external system 106 and be related to games with specific game personalities. When a specific personality that matches a particular player profile 306, a gaming machine 102 attempts to entice one or more specific players, such as players John 302 and Fred 304, to play gaming machine 102. Gaming machine 102 may send out a communication using different methods, such as text messages via a wireless connection to cellular phones, or system messages over network 108 to an external system such as a player tracking system or server 104 containing player profile information to locate player 302 and 304, route messages from the gaming machine 102 to the players 304 and 302 over network 108 to an in-house phone system, such as a Voice-over-IP phone system, leave a message for the player on his/her hotel room phone, directly to the player's home phone, or using other communication methods that may be available within the gaming establishment.

Two gaming machines 102a and 102b may be located anywhere within the gaming establishment. Gaming machine 102a has not been played for 20 minutes. Gaming machine 102b includes a game personality that matches a specific player profile 306 (e.g., John) and sends a message to the external player tracking system 104 to route a message to display on the gaming machine 102b game screen or player tracking screen for John. Also, a text message may be sent using wireless communication from gaming machine 102a to another player (e.g., Fred). For example, the message may be sent to a cell phone or other device different from gaming machine 102a being played.

A message is displayed on a game screen of gaming machine 102b for John to see. Also, a text message is sent over a wireless communication network to Fred's cellular phone to indicate that gaming machine 102a is available to play for a $10,000 bonus located in a position (e.g., on gaming bank 20, game 2). A code, such as code Z1A1, may be displayed on gaming machine's 102a screen for the next 25 minutes or until the next player plays it before that time. In another embodiment, display technology, such as video screen technology, may be used to allow the gaming machine 102a to visually communicate with the player without interrupting the existing game. Any existing gaming machine may be retrofitted to display any messaging. The special bonus related information may also be displayed on an external display 308 located in one or more locations within the gaming establishment.

To avoid sending unwanted messages, a player may opt in to receive communication messages from gaming machines. For example, when a player signs up for a player tracking card, the player may indicate whether or not the player would like gaming machines 102 to contact them with an offer to play for a special bonus.

Gaming machines 102 may also be used to solicit players playing other gaming machines 102. For example, while player 304 is playing gaming machine 102b, gaming machine 102a may solicit the player. In one example, gaming machine 102a may send a message to gaming machine 102b that would display a message on gaming machine 102b. The message may be "Here's your promotion. Please come play gaming machine A1Z1 to redeem it." Or a gaming machine may solicit its favorite player playing another gaming machine 102 with free game play if the player comes in the next 15 minutes. In this way, gaming machine 102a can solicit players who are playing other gaming machines. Additionally, a private message may be sent to player 304, such as a text message. This may be useful when gaming machine 102b is made by another manufacturer and the soliciting gaming machine 102a can not communicate with the other gaming machine 102b for various reasons.

In other embodiments, gaming machines 102 may audibly solicit the players. For example, when it is detected that a particular player is nearby the gaming machine such as by the reading of an RFID device worn by the player, or a motion sensor connect to the gaming devices, the gaming machine 102 can announce to the player that an offer is available for that player, thus preventing the player from leaving the gaming establishment or from going to another group of machines. Other methods of communicating with players may be through electronic signage, displays, video screens, e-mail, kiosk messages, regular mail, or other methods.

For example, a game personality may indicate that when gaming machine 102 has not been played for a predetermined period of time, gaming machine 102 should request information of 10 players that have lost the most amount of money over the last 30 minutes. Gaming machines 102 would then randomly select as least one of the players and send a message to that player stating "if the player plays gaming machine #117 located at X location, he/she will receive 10 free game plays".

Gaming machine 102 may send out a message to all players that agree to be solicited and the first players that play twenty dollars in gaming machine 102 wins a bonus. Gaming machine 102 that has not be played for a random or predetermined period of time may also solicit players outside of the casino for example at home with an offer or bonus if they come and play the machine. Also, gaming machine 102 may provide players with information such as progressive levels or information about the play on the gaming device.

In a similar embodiment, a gaming machine 102 that has not been played for a certain period of time may determine to solicit its favorite player or it may just go into a bonus attract mode. Favorite players may be players that match a set of player profile characteristics with specific game behaviors defined within the gaming machine's game personality. For example, a certain amount of play on gaming machine 102 may indicate that this gaming machine is a favorite of a player. The game personality may indicate a threshold of play for determining a favorite player. Also, the percentage of play on this gaming machine 102 compared with all other gaming machines in the gaming establishment may be used. For example, if the player plays 20% of time at this gaming machine, the player is considered a favorite.

In other embodiments, the game personality indicates that gaming machine 102 should notify its favorite player or players with a particular player profile that a winning hand (e.g., four aces with a kicker) has not been won/hit for a certain amount of time (e.g., 3000 hands or 2 days). The player profile includes the player's play history information that the player plays for four aces with a kicker, and gaming machine 102 may solicit the player. Furthermore, in the player profile the player may request for progressive gaming machines to notify the player when the progressive value reaches a predetermined value selected by the player. Gaming machine 102 may also notify the player if it is moved to a new location.

A bonus attract mode is designed to lure a player or customer to play gaming machine 102 (that is close enough to be aware of the bonus attract mode) and for the opportunity to receive a bonus. For example, gaming machine 102 may determine a player that has won a certain amount of money at gaming machine 102 and try to get the player to change gaming machines 102 to play this gaming machine. The bonus attract mode may determine when there are players close enough to be aware of the bonus offer. This determination may be made by querying a player tracking system for real-time player profile information, which may provide where players are currently playing machines. Also, global positioning software for devices (e.g., a player's card, cellular phone, any wireless device) may be used to determine where clusters of players are in the gaming establishment. Optical devices may also detect that players are nearby. Gaming machine 102 may also detect which of gaming machines 102 near by are being played.

In one example, server 104 may check the gaming establishment gaming are (e.g., casino floor) to determine were there are the most players playing games. The closest gaming machine 102 to the most players may go into bonus attract mode. The bonus may be selected based on the game personality. For example, gaming machines 102 that go into bonus attract mode select their own bonus promotion based on the game personality, which may specify the type of bonus.

By allowing gaming machines 102 to solicit players, it is possible the gaming machines 102 that have games manufactured by one manufacturer may solicit players who are playing at a gaming machine 102 of another manufacturer. In this way, the manufacturer may be able to solicit or entice players to play their games and lure players away from other manufacturer's games.

In another bonus example, gaming machines may have a daily budget for player bonusing (e.g., $25.00). One of the gaming machine's personality traits may comprise when gaming machine 102 has not been played for a certain amount of time (e.g., three hours) the gaming machine triggers itself to go into bonus attract mode. Another trait may be gaming machine 102 determines it will bonus the next player who plays ten games on the gaming machine an amount of $15.00. In one example, the video screens of the device may change colors and display "Bonus of $15.00 for the next player to play ten games on this gaming machine". Also, gaming machine 102 may be designed to make sounds to attract surrounding players and to communicate audibly in a human voice saying, "Bonus to the next player to play ten games". The cabinet of gaming machine 102 may also chance colors and have lights and LEDs installed on various locations of the gaming machine's cabinet that turn on and off in a variety of different sequences to attract players in the general location of gaming machine 102.

Gaming machines 102 may automatically team up with other gaming machines not being played without any player interaction or external control. In one embodiment, once a gaming machine that is not being played automatically determines that it is going into bonus mode to attract players to play it, the gaming machine may communicate with other gaming machines 102 not being played to attract more players. Based on a game personality, gaming machine 102 may automatically decide that all gaming machines 102 that have not been played in the last hour will go into the bonus attract mode. This may go on until player(s) plays each of the gaming machines 102 or may continue for a predetermined interval of time.

Gaming machines 102 that have not been played may be defined as those games casino wide, those games within a specific casino quadrant, those games "near" the bar, those games "near" the buffet, those games located on a single bank of games, and those games located on a plurality of banks "near" the bonus initiating gaming machine 102. The gaming machine's definition of "near" may include the definition of a predefined number of games located by quadrant, section or location within the casino and may also include only those games created by the same manufacturer within a particular area or on a particular bank of machines.

A grouping of gaming machines 102 may thus be determined The grouping may then go into the bonus attract mode. By grouping multiple gaming machines 102 together, this may cause multiple players to leave gaming machines 102 to find a gaming machine 102 that is offering a bonus. In one embodiment, gaming machines 102 may all offer and award the same bonus. In other embodiments, gaming machine 102 may not offer and award the same bonus, thereby providing players with a plurality of different bonuses, promotions and awards.

The gaming machines may be operable to communicate with each other directly, with or without the use of an external system, and offer a common bonus. The gaming machines may also establish a common prize pool of money and award a Big Bonus to a single lucky player playing one of the gaming machines. Each gaming machine in the bonus mode may try to contact specific players or simply attract any player that may be passing by the gaming machine or is close enough to be attracted to the gaming machine in order to play it and have an opportunity to win a Bonus.

Figure 4A:
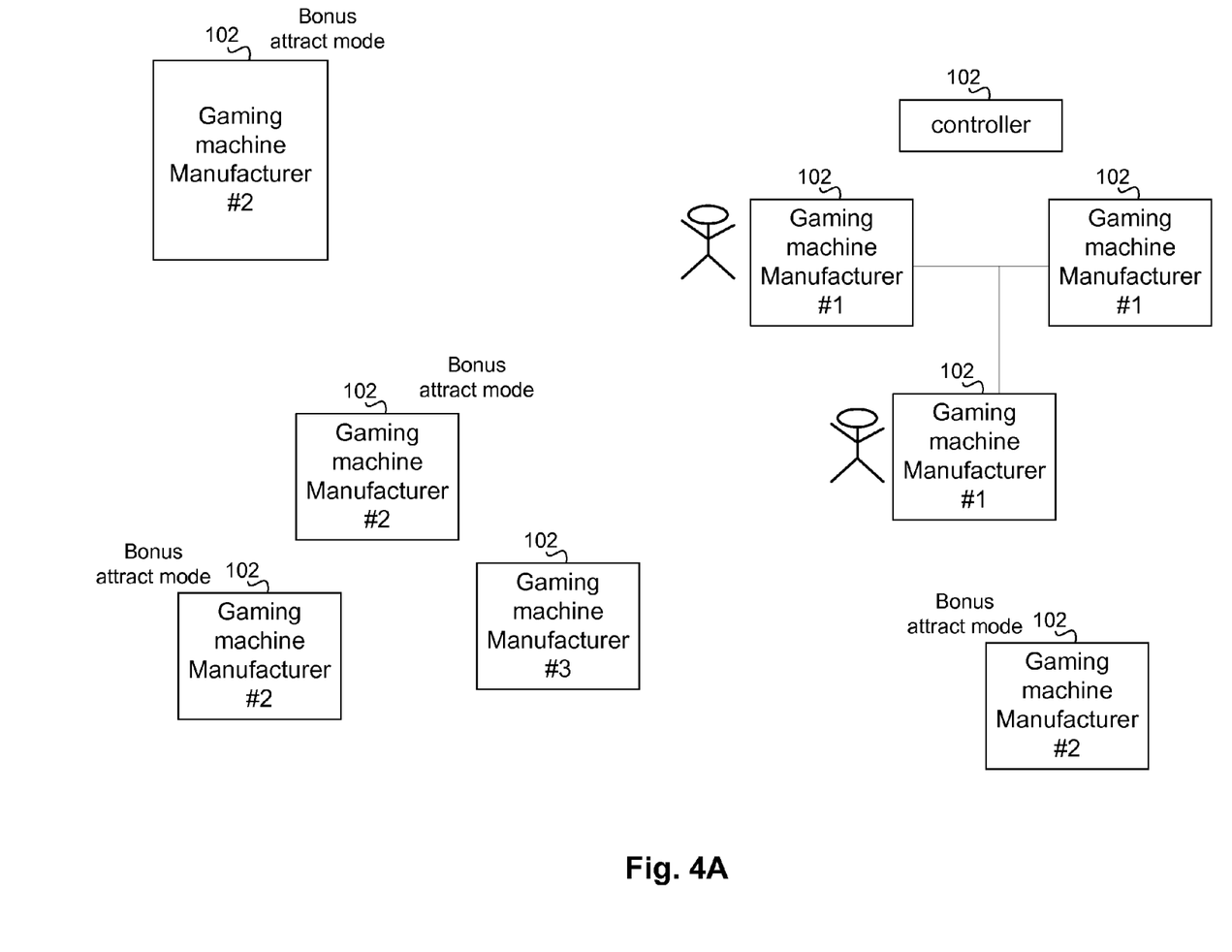
FIG. 4A shows an example system for providing a bonus attract mode according to one embodiment.

FIG. 4A shows an example system for providing a bonus attract mode according to one embodiment. Gaming machines 102 for multiple manufacturers may be provided on a gaming floor. These manufacturers are labeled as manufacturer #1, #2, and #3. A manufacturer may be company offering the type of game being played, a manufacturer of the gaming machine, or any other entity that has an interest in the game. As is shown, players are playing gaming machines for manufacturer #1 and #3. When gaming machines for manufacturer #2 are not being played, they may go into a bonus attract mode. It will be understood that gaming machines for manufacturer #2 may be currently be being played by a user, but still may go into a bonus attract mode.

Figure 4B:
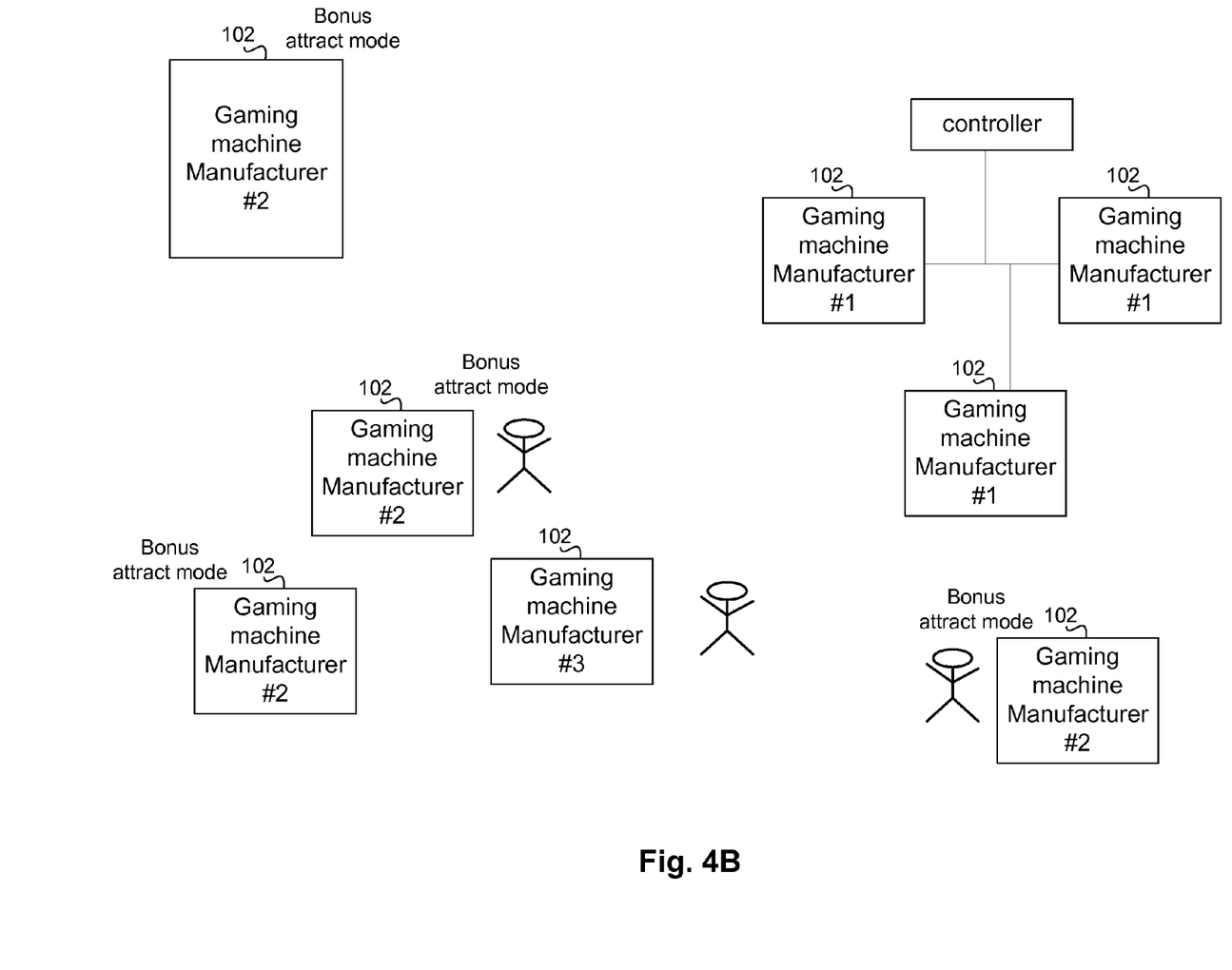
FIG. 4B shows a second example of a system for providing the bonus attract mode according to one embodiment.

FIG. 4B shows a second example of a system for providing the bonus attract mode according to one embodiment. The gaming machines of manufacturer #2 may attract the players through various methods discussed above. A result of the attract mode may lure players from other gaming machines. As shown, players from moved from gaming machines for manufacturer #1 and #3 to gaming machines for manufacturer #2. Thus, manufacturer #2 has successfully attracted players from other machines. Also, a new player is now playing a gaming machine for manufacturer #2. The bonus attract mode may have caused the new player to play.

Methods

Figure 5:
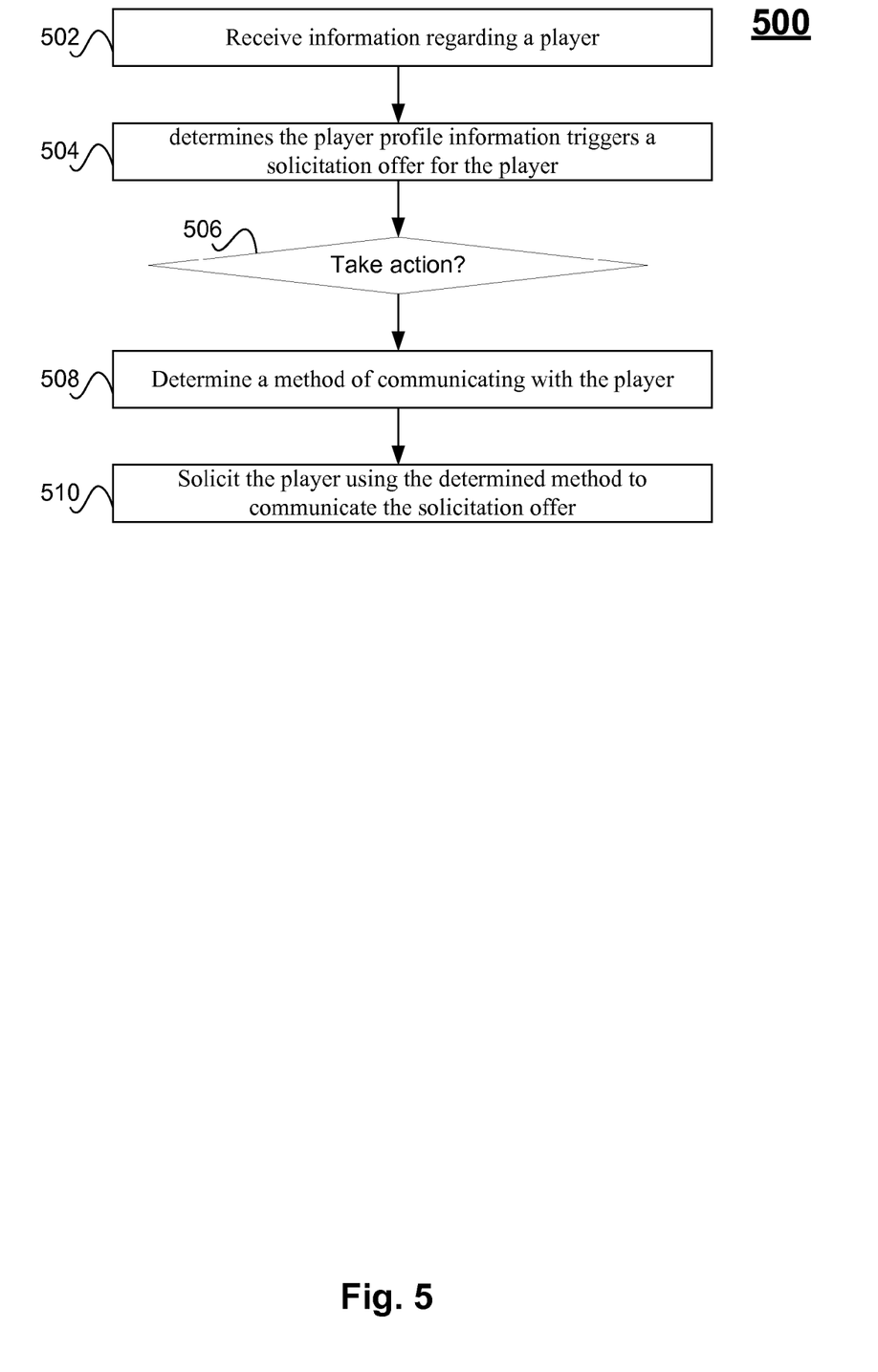
FIG. 5 depicts a simplified flowchart of a method for determining whether a player should be solicited according to one embodiment.

FIG. 5 depicts a simplified flowchart 500 of a method for determining whether a player should be solicited according to one embodiment. The method may be performed at server 104, gaming machine 102, at another machine, or any combination thereof.

Step 502 receives information regarding a player. For example, player profile information, such as that located within a player's play profile, may be historical information about which games a player has played from a player tracking system. Player profile information may also be real-time information for a player that has been playing games for a certain time period, such as the last hour or two. Other information regarding a player's profile, such as which games a player prefers, etc. may be included.

Step 504 determines if the player profile information triggers a solicitation offer for the player. For example, the player profile information may be run through a number of gaming machine game personalities. That is, the player profile information may be run through a set of rules for each game personality. A solicitation offer may be determined when the player profile information is run through the game personality that triggers an offer.

Step 506 determines if an action should be taken. If not, the process reiterates to step 502.

If an action should be taken, step 508 determines a method of communicating with the player. As discussed above, different methods of communicating with the player will be appreciated.

Step 510 then solicits the player using the determined method to communicate the solicitation offer. In one example, if it is determined that a player is losing money at one gaming machine, then a gaming machine at which the player has previously won money may determine that it should offer the player a promotion. The promotion may be "Receive a certain amount of credits if you come play this gaming machine in a certain amount of time."

Figure 6:
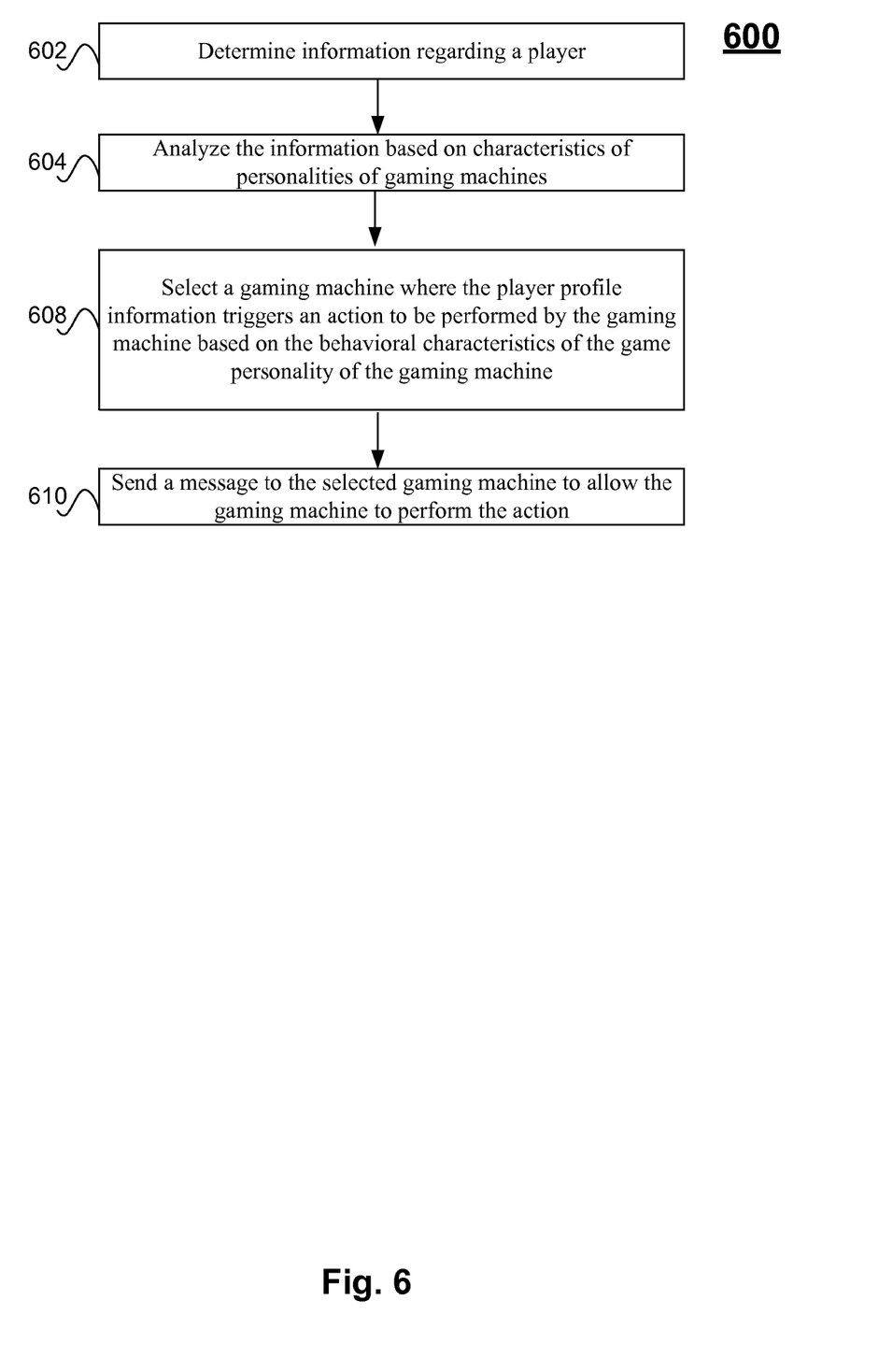
FIG. 6 depicts a simplified flowchart of a method for determining actions to perform according to one embodiment.

FIG. 6 depicts a simplified flowchart 600 of a method for determining actions to perform according to one embodiment. Step 602 determines information regarding a player. Step 604 analyzes the information based on characteristics of personalities of gaming machines 102. For example, server 104 may run player profile information through a plurality of personalities for gaming machines 102.

Step 606 selects a gaming machine where the player profile information triggers an action to be performed by the gaming machine based on the behavioral characteristics of the game personality of the gaming machine. For example, the player profile information may be run through a large number of gaming machine game personalities either at the gaming machine 102 or at the server 104.

One of the game personalities may trigger one of a plurality of actions to be performed. One such action may be a solicitation to one or more players matching the game personality that caused the triggered to occur.

Step 608 sends a message to the selected gaming machine to allow the gaming machine to perform the action. For example, server 104 may send a message to a selected gaming machine indicating that the gaming machine should solicit the player with a certain offer selected from a plurality of offers and promotions.

Particular embodiments may be implemented in a computer-readable storage medium for use by or in connection with the instruction execution system, apparatus, system, or machine. The computer-readable storage medium contains instructions for controlling a computer system to perform a method described by particular embodiments. The instructions, when executed by one or more processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. A method comprising:
determining player information for a player;
determining a first game personality for a first gaming machine, the first game personality being a first set of behavior characteristics that is individually configured for the first gaming machine, wherein a second gaming machine is individually configured with a second game personality being a second set of behavior characteristics, and wherein at least one of the first or second set of behavior characteristics is separate from game logic of a first or second game that the first or second gaming machine is offering;
determining if a solicitation for the first gaming machine is triggered by applying the player information for a player to the first game personality, wherein the solicitation for the first gaming machine is individually determined based on the first set of behavior characteristics for the first gaming machine and a solicitation for the second gaming device is individually determined based on the second set of behavior characteristics for the second gaming machine; and
causing the solicitation to be performed for the player if the solicitation is triggered.

2. The method of claim 1, wherein the causing the solicitation comprises using the first gaming machine to communicate with the player.

3. The method of claim 2, wherein communicating with the player is through a wireless network to a wireless device.

4. The method of claim 2, wherein communicating with the player is through a network.

5. The method of claim 1, wherein the communication comprises sending a message to the player through a player tracking system.

6. The method of claim 1, wherein causing the solicitation comprises sending a message to solicit the player who is using another gaming machine.

7. The method of claim 1, wherein the solicitation comprises changing game play for the player if the player is currently playing the first gaming machine.

8. The method of claim 1, wherein causing the solicitation comprises outputting an audible message when the player is detected to be within a certain distance of the first gaming machine.

9. The method of claim 1, wherein the personality comprises rules and actions, wherein the player information is applied to the rules to determine the solicitation.

10. The method of claim 1, wherein the game personality changes over time based on interaction of the player with the first gaming machine, wherein the set of behavior characteristics change based on the interaction.

11. The method of claim 1, a controller associated with the first gaming device is programmed with the first set of characteristics.

12. A method comprising:
determining a first game personality for a first gaming machine that is not being played, the first game personality being a first set of behavior characteristics that is individually configured for the first gaming machine, wherein a second gaming machine is individually configured with a second game personality being a second set of behavior characteristics, and wherein at least one of the first or second set of behavior characteristics is separate from game logic of a first or second game that the first or second gaming machine is offering;
triggering a solicitation offer for the first gaming machine that is not being played based on the first game personality, wherein the solicitation for the first gaming machine is individually determined based on the first set of behavior characteristics for the first gaming machine and a solicitation for the second gaming device is individually determined based on the second set of behavior characteristics for the second gaming machine;
causing the first gaming machine to enter an attract mode to offer the solicitation offer; and
providing the solicitation offer on the first gaming machine when a player interacts with the first gaming machine in response to the attract mode.

13. The method of claim 12, further comprising sending a message the player to alert the player of the solicitation offer.

14. The method of claim 13, wherein the first gaming machine is associated with a first game manufacturer, wherein the player is sent the message while the player is playing another gaming machine associated with a second game manufacturer.

15. The method of claim 13, further comprising:
determining the player by applying player information for a plurality of players to the first game personality; and
soliciting the player in the attract mode.

16. A system comprising:
a plurality of gaming machines, wherein a portion of gaming machines include different game personalities, wherein a first game personality includes a first set of behavior characteristics that is individually configured for a first gaming machine in the plurality of gaming machines, and a second gaming machine is individually configured with a second game personality being a second set of behavior characteristics, and wherein at least one of the first or second set of behavior characteristics is separate from game logic of a first or second game that the first or second gaming machine is offering;
wherein the first gaming machine and the second machine are configured to:
determine player information for a player;
determine if a solicitation for the first or the second gaming machine is triggered by applying the player information for a player to the first or second game personality; and
cause the solicitation to be performed for the player if the solicitation is triggered.

17. The system of claim 16, wherein different game personalities cause different solicitations to be performed.

18. The system of claim 16, wherein the first gaming machine is associated with a first game manufacturer, wherein the solicitation solicits the player that is playing the second gaming machine associated with a second game manufacturer.

19. The system of claim 18, wherein the first gaming machine is configured to send a message to the player playing the second gaming machine to solicit the player.

20. The system of claim 18, wherein the first gaming machine is configured to go into a bonus attract mode to solicit the player.

21. The system of claim 16, wherein different gaming machines have different favorite players, wherein the different gaming machines solicit different favorite players when the solicitation is to be performed.

22. The system of claim 16, wherein different game personalities include different rules and actions, wherein the player information is applied to the different rules to determine different solicitations.

23. A method comprising:
- receiving a game personality for a gaming machine, the game personality being a set of behavior characteristics that is individually configured for the gaming machine;
- determining, individually by the gaming machine, that the gaming machine has not been played for a period of time, wherein the period of time is a random or predetermined period of time since the last time the gaming machine was played that is determined based on the set of behavior characteristics;
- triggering, individually by the gaming machine, a solicitation offer for the gaming machine that is not being played based on the random or predetermined period of time;
- causing the gaming machine to enter an attract mode to offer the solicitation offer; and
- providing the solicitation offer on the gaming machine when a player interacts with the gaming machine in response to the attract mode.

* * * * *